United States Patent [19]

Izumiya

[11] 4,245,892
[45] Jan. 20, 1981

[54] OPTICAL SYSTEM HAVING AN OPTICAL SURFACE CONTAINING ASPHERICAL TERMS WITH REAL NUMBER POWERS

[75] Inventor: Naoki Izumiya, Hachioji, Japan

[73] Assignee: Konishiroku Photo Industry Co., Ltd., Tokyo, Japan

[21] Appl. No.: 953,347

[22] Filed: Oct. 23, 1978

[30] Foreign Application Priority Data

Oct. 29, 1977 [JP] Japan .............................. 52-129243

[51] Int. Cl.³ ............................................... G02B 3/04
[52] U.S. Cl. .................................................... 350/189
[58] Field of Search .......................................... 350/189

[56] References Cited

U.S. PATENT DOCUMENTS

| | | | |
|---|---|---|---|
| 2,893,290 | 7/1959 | Miles | 350/189 |
| 3,224,331 | 12/1965 | Kompfner | 350/189 |
| 3,899,244 | 8/1975 | Mulder | 350/189 |

*Primary Examiner*—Conrad J. Clark
*Attorney, Agent, or Firm*—Bierman & Bierman

[57] ABSTRACT

An optical system is provided which has an optical surface capable of being selected continuously between dimensionally numbered aberrations. The optical surface has a symmetry of revolution with respect to its horizontal axis defined by the length of a horizontal perpendicular from an arbitrary point on the surface to a plane tangential to the vertex of the surface, which is represented as a function of an absolute value for the height of the arbitrary point from the optical axis. The function contains aspherical terms with real number powers which are greater than 2, but not an integer.

1 Claim, 6 Drawing Figures

OPTICAL SYSTEM HAVING AN OPTICAL SURFACE CONTAINING ASPHERICAL TERMS WITH REAL NUMBER POWERS

This invention relates to an optical system having an optical surface containing aspherical terms with real number powers for enabling effective correction for various types of aberrations in the optical system.

Upon describing the form of an optical surface S which has a symmetry of revolution with respect to its optical axis as shown in FIG. 1, it is known that the quadratic surface of revolution including an aspherical surface and a flat surface can be represented, by expressing the perpendicular distance QoQ from an arbitrary point Q on the optical surface to the tangential plane $OQ_o$ at the vertex O of the optical surface as an absolute value $|Q_TQ|$ for the height of the point Q from the optical axis, as shown in equation (1):

$$X = \frac{ch^2}{1 + \sqrt{1 - (1+k)c^2h^2}} \quad (1)$$

where
- h represents QoQ,
- x represents $|Q_TQ|$,
- c represents the vertex curvature of the quadratic surface of revolution, and
- k represents the parameter for the configuration of the quadratic surface of revolution as a hyperbolic surface of revolution for $k<1$, a parabolic surface of revolution for $k=-1$ and a ellipsoidal surface of revolution for k other than the above values.

Providing in the equation (1) above that the radius of curvature at the vertex of the quadratic surface of revolution is $r_o$ excepting the case for a flat surface, the equation (1) can be developed as in the following equation (2):

$$X = \frac{1}{2\gamma_o} h^2 + \sum_{m=2}^{\infty} \frac{(2m-3)!!}{m!2^m} \frac{(1+k)^{m-1}}{\gamma_o^{2m-1}} h^{2m} \quad (2)$$

In aspherical surfaces in a symmetry of revolution employed so far for the correction of aberrations in optical systems, since the quadratic surfaces of revolution are developed into terms with even number powers for h as shown in the equation (2), only those having flat surfaces or quadratic of revolution as the generating surface and with an amount of deformation therefrom, that is, aspherical terms $\Delta x$ represented as in equation (3) have been considered, although with few exceptions:

$$\Delta x = \sum_{n=1}^{N} a_n h^{2n} \quad (3)$$

where $a_n$ represents a coefficient for the aspherical terms.

The first exception referred to above includes, for example, those defining the form of the aspherical surfaces not based on the quadratic surface of revolution as the generating surface, such as log-cos surfaces as disclosed in Japanese Examined Patent Publication No. 11771/1971. However, since the log-cos surfaces can also be developed into terms with even number powers for h, it can be developed in the form of the equation (3) by employing a flat generating surface and expanding N infinitely.

The second exception includes those, for example, as disclosed by the invention in U.S. Pat. No. 3,459,468 wherein the form of the aspherical surface is represented not by h, that is, by the value of $|Q_TQ|$ as shown in FIG. 1 but by the absolute value for OQ, that is, the length of the chord from the vertex. In this exception, however, it can also be developed into terms with even number powers for h as in the equation (3), since the amount for the deformation is set by terms with respect to the length of the chord with even number powers.

As the third exception, Pierre Lacomme proposed such an optical system having an optical surface using an aspherical surface containing the terms $h^P$ with P being $1<P<2$ for the correction of the Petzval curvature. Such an optical surface containing the above terms can not, however, be applied optically to usual optical systems since the radius of curvature at the vertex of the surface is 0 and the refraction at the medium interface of such a form becomes infinite.

The conditions required for forming a practical aspherical surface are deduced as follows. The form of a surface in an arbitrary symmetry of revolution can be represented using real number Pn as in the equation (4).

$$\Delta x = \sum_{n=1}^{N} a_n h^{P_n} \quad (4)$$

N may be a finite or an infinite number, which has no effects on the following consideration.

An aspherical surface employed in usual optical systems should at first satisfy the condition that it has a plane tangent to its vertex and vertical to the optical axis, that is, the symmetrical axis for the revolution. The above condition is equivalent to that the differentiation result of the equation (4) with h is zero at $h=0$. That is, the equation:

$$\frac{dx}{dh} = \sum_{n=1}^{N} a_n P_n h^{P_n - 1} \quad (5)$$

should be zero at $h=0$. It is apparent that Pn should always be greater than 1 in order to satisfy the above condition. The meanings of the lower limit for the inequality symbol given by Lacomme for the range of P can be understood in this regard. Then, the radius of curvature at the vertex of such rotationally symmetrical surface can be obtained by substituting h ($=0$) into the function resulted through the differentiation of the equation (5) by h or into the function obtained through second order differentiation of the equation (4) by h. That is to say, the radius of curvature $r_o$ at the vertex can thus be represented as in equation (6):

$$\gamma_o = \frac{d_2 x}{dh^2} \bigg|_{h=o} \quad (6)$$

$$= \sum_{n=1}^{N} a_n P_n (P_n - 1) h^{P_n - 2} \bigg|_{h=o}$$

Accordingly, while $r_o$ has a finite value at $Pn=2$, it becomes infinite at $Pn<2$, whereby the refraction increases infinitely, as above described, and this condition will be rendered the application of the equation impossible to usual optical systems. With respect to the terms at $Pn<2$, however, they are zero at $h=0$ giving no effects on the magnitude of the radius of curvature at the vertex.

The only condition required for a practical aspherical surface is therefore that Pn for all of the terms is whether equals to or greater than 2, and the value in the later for Pn need not be restricted to even numbers but it may be in any real number.

The novel feature of this invention is to allow and positively utilize the terms having, as the values for Pn in the equation (4) for expressing the configuration of the aspherical surface, those values not containing practically meaningless values as proposed by Pierre Lacomme, and not restricting only to even numbers as conventionally employed in the prior art, all as explained in more detail below with reference to the attached drawings in which.

Figure 2:
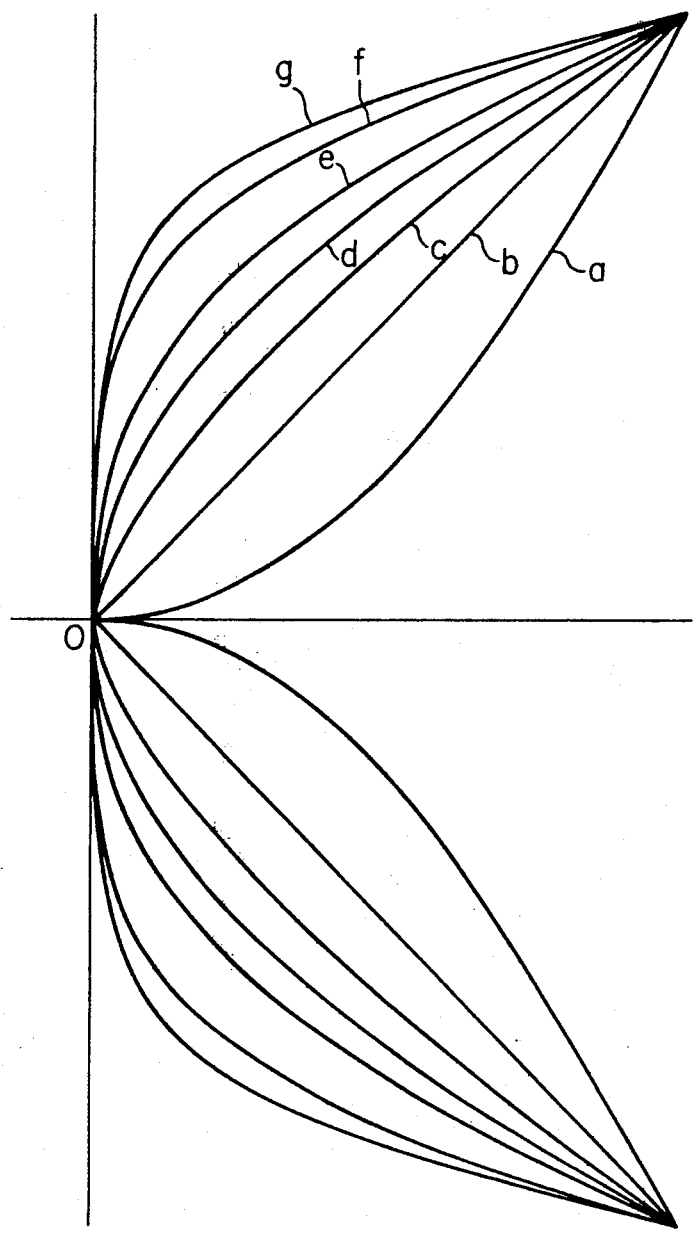
FIG. 2 shows several examples of aspherical surfaces according to the present invention as a diagrammatic view illustrating cross sections along the optical axis, comparing examples of aspherical surfaces according to this invention with aspherical surfaces conventionally used as well as several surfaces not usually used as the optical surface.

Optical surfaces of this invention and other optical surfaces are shown in FIG. 2 for understanding the concept of the form of the optical surfaces according to this invention.

FIG. 2 shows aspherical surfaces in their cross sections containing optical axis prepared by rendering a generating plane aspherical by a single aspherical term, in which the coefficient for the aspherical term of each of the aspherical surfaces is made constant. In the figure, a and b represent the optical surfaces where the power number P for the aspherical term is equal to or less than 1, in which $P=0.5$ for a and $P=1$ for b. In these cases, the surfaces have no vertical tangential plane at the vertex O to the optical axis and the vertex is pointed to render the application impossible to usual optical systems. The surface c represents an example using an aspherical term proposed by Lacomme in which $P=1.5$. While the surface has a tangential plane at its vertex, its radius of curvature at the vertex is 0. d and f represent examples using aspherical terms conventionally employed so far in which $P=2$ for d and $P=4$ for f. On the contrary, the surfaces e and g represent examples using the aspherical terms according to this invention, in which $P=2.5$ for e and $P=5$ for g. On comparing the surfaces e and g with the surfaces d and f conventionally employed so far, it is apparent that they show no essential difference between their forms.

Reference will then be made for the aberration obtained by the aspherical terms according to this invention in order to show the advantages to be obtained by using such aspherical terms.

Since the increment in the so-called Seidel's third order aberration in the aspherical surface using the aspherical term with power number $P=4$ is well known, comparison will be made between the above increment in the third order aberration and the increment in the aberration using the aspherical terms according to this invention where the power numbers P are greater than 2 and smaller than 4.

According to H. H. Hopkins, the increment in the third order aberration using the aspherical terms with the power number $P=4$, can be induced by the increment in the wave front aberration represented by the difference of optical paths between the generating surface and the above aspherical surface.

An optical surface having, for example, a quadratic surface of revolutional as the generating surface rendered aspherical by an aspherical term with a power number of 4 and a coefficient of b can be represented as in equation (7)

$$x = \frac{ch^2}{1 + \sqrt{1 - (1+k)c^2h^2}} + bh^4 \quad (7)$$

Assuming that light proceeds from a medium with a refractive index N through the above aspherical surface into another medium with a refractive index N', the increment $\delta W | P=4$ in the wave front aberration by the aspherical term in the above aspherical surface can be represented as in equation (8)

$$\gamma W | P = 4 = (N' - N)b\{(\rho_o^2 + 2Y_s\rho_o\cos\phi + Y_s^2)^2 - Y_s^4\} \quad (8)$$

Figure 1:
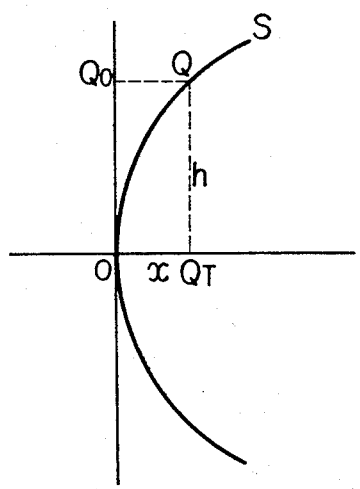
FIG. 1 is a diagram explaining the variables describing the form of an aspherical surface.
Figure 3:
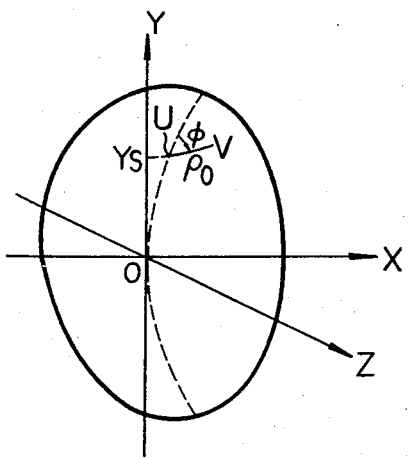
FIG. 3 is a diagrammatic view for the explanation of variables describing wave front aberration.

As shown in FIG. 3 axes Y and Z are taken on the tangential plane at the vertex of the aspherical surface, while setting the axis Y as a crossing line of the meridional plane and the tangential plane and setting the axis Z in perpendicular thereto, and the crossing point of the aspherical surface and the principal ray is defined as U and the crossing point of an arbitrary light of the optical ray including the above principal ray is defined as V. Then, in the equation (8) above, Ys represents U along Y coordinates, $\rho_o$ represents an absolute value for the distance between the points U and V and $\phi$ represents an angle between the arc $\widehat{UV}$ and the arc $\widehat{UO}$ of the meridional cross section containing U.

Then, an aspherical surface is considered as shown in equation (7) for the case where the number powers P for the aspherical surface is greater than 2 and smaller than 4 but is arbitrary real number and it is shown in equation (9)

$$x = \frac{ch^2}{1 + \sqrt{1 - (1+k)c^2h^2}} + ah^P \quad (9)$$

In the equation (9), a represents a coefficient for the aspherical surface. The increment $\delta W | 2 < P < 4$ in the wave front aberration by the aspherical term $ah^P$ of such aspherical surface can be represented as in equation (10) using the same definition as in the equation (8).

$$\gamma W|_{2<P<4} = (N' - N)a\{(\rho_o^2 + 2Y_s\rho_o\cos\phi + Y_s^2)^{\frac{P}{2}} - |Y_s|^P\} \quad (10)$$

The increment in the wave front aberration for the case of P=4 can be represented through the development of the equation (8) as in equation (11).

$$\delta W|_{p=4} = (N'-N)b\rho_o^4 + (N'-N)b4Y_s\rho_o^3\cos\phi \quad (11)$$
$$+ (N'-N)b4Y_s^2\rho_o^2\cos^2\phi + (N'-N)b2Y_s^2\rho_o^2$$
$$+ (N'-N)b4Y_s^3\rho_o\cos\phi$$

On the other hand, where $\rho_o$ is greater than the absolute value for Ys, that is, where the absolute value for the distance of an optical light from the principal ray on the aspherical surface is greater than the absolute value for the height in the principal ray from the optical axis, the increment $\delta W|2<P<4$ in the wave front aberration at $2<P<4$ can be approximated as in equation (12).

$$\gamma W|2<p<4(\rho_o > |Y_s|) \quad (12)$$
$$= (N'-N)a\{(\rho_o^p(1 + 2Y\frac{Y_s}{\rho_o}\cos\phi + \frac{Y_s^2}{\rho_o^2}) - |Y_s|^p\}$$

$$= (N'-N)a\rho_o^p + (N'-N)aPY_s\rho_o^{p-1}\cos\phi$$
$$+ (N'-N)a\frac{P}{2}Y_s^2\rho_o^{p-2}$$
$$+ (N'-N)a\frac{P(p-2)}{2}Y_s^2\rho_o^{p-2}\cos^2\phi$$

where those terms with the number powers for $|Y_s|$ greater than 2 are considered negligible.

Then, where $\rho_o$ is smaller than the absolute value for Ys, the increment $\delta W|2<P<4$ can be approximated as in equation (13).

$$\gamma W|_{2<p<4}(\rho_o < |Y_s|) \quad (13)$$
$$= (N'-N)a\{|Y_s|^p(1 + 2\frac{\rho_o}{Y_s}\cos\phi + \frac{\rho_o^2}{Y_s^2})^{\frac{P}{2}} - |Y_s|^p\}$$
$$= (N'-N)aP|Y_s|^{p-2}Y_s\rho_o\cos\phi$$
$$+ (N'-N)a\frac{P}{2}|Y_s|^{-2}\rho_o^2$$
$$+ (N'-N)a\frac{P(p-2)}{2}|Y_s|^{p-2}\rho_o^2\cos^2\phi$$

where those terms with number powers for $\rho_o$ greater than 2 are considered negligible.

Accordingly, the increment in the wave front aberration at $2<P<4$ can formally be represented as in equation (14):

$$\delta W|_{2<p<4} = (N'-N)a\rho_o^p \quad (14)$$
$$+ (N'-N)aPY_s\rho_o^{p-1}\cos\phi$$
$$+ (N'-N)a\frac{p(p-2)}{2}Y_s^2\rho_o^{p-2}\cos^2\phi$$
$$+ (N'-N)a\frac{p}{2}Y_s^2\rho_o^{p-2}$$
$$+ (N'-N)aP|Y_s|^{p-2}Y_s\rho_o\cos\phi$$
$$+ (N'-N)a\frac{p(p-2)}{2}|Y_s|^{p-2}\rho_o^2\cos^2\phi$$
$$+ (N'-N)a\frac{p}{2}|Y_s|^{p-2}\rho_o^2$$

Meanings for each of the terms in the equation (11) are well known and the meanings for each of the terms in the equation (14) corresponding thereto are shown in Table 1.

TABLE 1

| Wave front aberration term p = 4 | Corresponding third order aberration | Wave front aberration term 2<p<4 | Corresponding aberration |
|---|---|---|---|
| $(N'-N)b\rho_o^4$ | Spherical aberration | $(N'-N)a\rho_o^p$ | Lower order spherical aberration |
| $(N'-N)b4Y_s\rho_o^3\cos\phi$ | Coma | $(N'-N)aPY_s\rho_o^{p-1}\cos\phi$ | Lower order coma |
| $(N'-N)b4Y_s^2\rho_o^2\cos^2\phi$ | Tangential focus shift | $(N'-N)a\frac{p(p-2)}{2}|Y_s|^{p-2}\rho_o^2\cos^2\phi$ | Lower order tangential focus shift |
| $(N'-N)b2Y_s^2\rho_o^2$ | Sagittal focus shift | $(N'-N)a\frac{p}{2}|Y_s|^{p-2}\rho_o^2$ | Lower order sagittal focus shift |
| $(N'-N)b4Y_s^3\rho_o\cos\phi$ | Distortion aberration | $(N'-N)aP|Y_s|^{p-2}Y_s\rho_o\cos\phi$ | Lower order distortion aberration |
| | | $(N'-N)a\frac{p}{2}Y_s^2\rho_o^{p-2}(1+(p-2)\cos^2\phi)$ | Image field curvature near the optical axis |

On the basis of a known relation between the increment in the wave front aberration at P=4 as shown in the equation (11) and the increment in the ray aberration on the image plane of the optical system and on the same ground, it can be deduced that the increment in the wave front aberration as in the equation (14) where the power numbers P of the aspherical terms are greater than 2 and smaller than 4 has the meaning as shown in Table 1.

Where the increment $\delta W$ in the wave front aberration by the aspherical terms is expressed as the function of Ys, $\rho_o$ and $\phi$ as shown in the equation (8) or in the equation (10), the increment $\Delta W$ in the wave front aberration in the exit pupil of an optical system is represented as the function of an ideal image height and the radius vector $\rho$ and the phase $\phi$ of the polar coordinates set to the exiting pupil, and $\eta$ and $\rho$ have a relation with respect to Ys and $\rho_o$ as shown in equation (15) when using constants $k_1$ and $k_2$ determined by the optical system.

$$\eta = Y_s/k_2$$
$$\rho = \rho_o/|k_1| \quad (15)$$

Accordingly, the increment $\Delta W$ in the wave front aberration in the exit pupil corresponding to the increment $\delta W$ in the wave front aberration by the aspherical terms shown in the equation (8) and the equation (10) can be represented as in equation (16) and equation (17) respectively.

$$\Delta W|_{p=4} = \quad (16)$$
$$(N'-N)b\{(k_1^2\rho^2 + 2|k_1|k_2\eta\rho\cos\phi + k_2^2\eta^2)^2 - k_2^4\eta^4\}$$
$$\Delta W|_{2<p<4} = \quad (17)$$

-continued $$(N' - N)a\{(k_1^2\rho^2 + 2|k_1|k_2\eta\rho\cos\phi + k_2^2\eta^2)^{\frac{P}{2}} - |k_2|^P|\eta|^P\}$$

With respect to those terms as expanded in the equation (11) and the equation (14), the increment $\delta W$ can also be represented as the terms corresponding to the increment $\Delta W$ in the wave front aberration in the exit pupil as in equation (18) and equation (19):

$$\Delta W|_{p=4} = (N' - N)bk_1^4\rho^4 \qquad (18)$$
$$+ (N' - N)b4|k_1|^3k_2\eta\rho^3\cos\phi$$
$$+ (N' - N)b4k_1^2k_2^2\eta^2\rho^2\cos^2\phi$$
$$+ (N' - N)b2k_1^2k_2^2\eta^2\rho^2$$
$$+ (N' - N)b4|k_1|k_2^3\eta^3\rho\cos\phi$$

$$\Delta W|_{2<p<4} = (N' - N)a|k_1|^p\rho^p \qquad (19)$$
$$+ (N' - N)aP|k_1|^{p-1}k_2\eta\rho^{p-1}\cos\phi$$
$$+ (N' - N)a\frac{p(p-2)}{2}k_1^2|k_2|^{p-2}|\eta|^{p-2}\rho^2\cos^2\phi$$
$$+ (N' - N)a\frac{p}{2}k_1^2|k_2|^{p-2}|\eta|^{p-2}\rho^2$$
$$+ (N' - N)aP|k_1||k_2|^{p-2}k_2|\eta|^{p-2}\eta\rho\cos\phi$$
$$+ (N' - N)a\frac{p}{2}|k_1|^{p-2}k_2^2\eta^2\rho^{p-2}(1 + (P-2)\cos^2\phi$$

Figure 4:
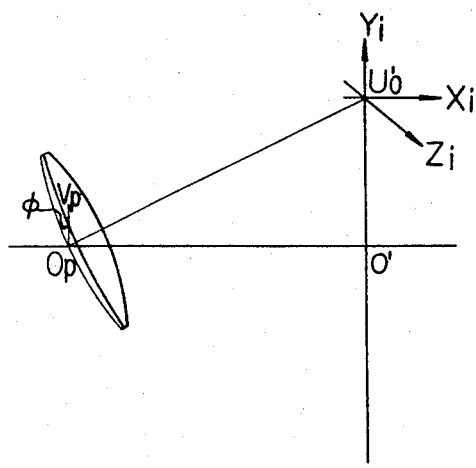
FIG. 4 is a diagrammatic view explaining the variables in the exit pupil plane and the image plane.

As shown in FIG. 4, taking the optical axis of an optical system as OpO' the ideal image point on the image plane as Uo', the ideal image height $\eta$ as O'Uo', the position of the exit pupil on the optical axis as Op, and the radius of the reference sphere UoOp of the exiting pupil as R, the polar coordinates for a point Vp on the exit pupil are represented as $(\rho, \phi)$ and cartesian coordinates Xi, Yi, Zi are set as the coordinates for the ray aberration taking the point Uo' as an origin while setting Xi in parallel with the optical axis and Yi in parallel with O'Uo'. Then, it is well known that relevant equations as equation (20) and equation (21) can be established for the increment $\Delta W$ in the wave front aberration in the exit pupil and $\Delta Yi$ and $\Delta Zi$ of the ray aberration in the direction of Yi and Zi for refractive index N'' of the medium in the image space:

$$\Delta Yi = -\frac{R}{N''}(\cos\phi\frac{2}{2\rho}\Delta W - \frac{\sin\phi}{\rho}\frac{2}{2\phi}\Delta W) \qquad (20)$$

$$\Delta Zi = -\frac{R}{N''}(\sin\phi\frac{2}{2\rho}\Delta W + \frac{\cos\phi}{\rho}\frac{2}{2\phi}\Delta W) \qquad (21)$$

Substitution of the equation (18) into the equation (20) and the equation (21) leads to the results as shown in equation (22) and equation (23):

$$\Delta Yi|_{p=4} = \frac{(N-N')}{N''}Rb4|k_1|\{|k_1|^3\rho^3\cos\phi + k_1^2k_2\eta\rho^2 \times \qquad (22)$$
$$(3\cos^2\phi + \sin^2\phi) + 3|k_1|k_2^2\eta^2\rho\cos\phi + k_2^3\eta^3\}$$

$$\Delta Zi|_{p=4} = \frac{(N-N')}{N''}Rb4|k_1|(|k_1|^3\rho^3\sin\phi + \qquad (23)$$
$$2k_1^2k_2\eta\rho^2\sin\phi\cos\phi + |k_1|k_2^2\eta^2\rho\sin\phi)$$

While on the other hand, substitution of equation (19) into the equation (20) and the equation (21) leads to results as shown in equations (24) and (25):

$$\Delta Yi|_{2<p<4} = \frac{(N-N')}{N''}RaP|k_1|(k_1^2\rho^2 + 2|k_1|k_2\eta\rho\cos\phi + \qquad (24)$$
$$k_2^2\eta^2)^{\frac{p-2}{2}} \times (|k_1|\rho\cos\phi + k_2\eta)$$

$$\Delta Zi|_{2<p<4} = \frac{(N-N')}{N''}RaP|k_1|(k_1^2\rho^2 + 2|k_1|k_2\eta\rho\cos\phi + \qquad (25)$$
$$k_2^2\eta^2)^{\frac{p-2}{2}} \times |k_1|\rho\sin\phi$$

The increment in the third order spherical aberration can be obtained by substituting $\eta=0$ into the equation (22) and the equation (23) as in equation (26):

$$\Delta Yi(\eta = 0)|_{p=4} = \frac{(N-N')}{N''}Rb4k_1^4\rho^3\cos\phi \qquad (26)$$
$$\Delta Zi(\eta = 0)|_{p=4} = \frac{(N-N')}{N''}Rb4k_1^4\rho^3\sin\phi$$

As will be apparent, $\Delta Yi$ and $\Delta Zi$ are in the same form as in those obtained by substituting the terms for $(N'-N)bk_1^4\rho^4$ in the equation (18) into the equation (20) or the equation (21) and the term $(N'-N)bk_1^4\rho^4$ is the term representing the increment in the third order spherical aberration.

In the same manner, substitution of $\eta=0$ into the equation (24) and the equation (25) provides the increment in the ray aberration as shown in equation (27):

$$\Delta Yi(\eta = 0)_{2<p<4} = \frac{(N-N')}{N''}RaP|k_1|^p\rho^{p-1}\cos\phi \qquad (27)$$
$$\Delta Zi(\eta = 0)|_{2<p<4} = \frac{(N-N')}{N''}RaP|k_1|^p\rho^{p-1}\sin\phi$$

Since it is apparent that the equation (27) also represents the term corresponding to the increment in the spherical aberration and it is of the same form as that obtained by substituting the term $(N'-N)a|k_1|^p\rho^p$ in the equation (19) into the equation (20) or the equation (21), it is shown that the term $(N'-N)a\rho\rho^p$ in Table 1 means the increment in the spherical aberration. Moreover, the term in the equation (27) shows a spherical aberration of $(P-1)$ order which is lower than the third order spherical aberration represented by the equation (26). As apparent from the comparison between the equation (26) and the equation (27), the equation (27) is in the same type as that of the equation (26) when P goes to its limit 4, which means that the spherical aberration of $(p-1)$ order continuously transfers to the third order spherical aberration.

The increment $\Delta Xi$ in the longitudinal aberration of the spherical aberration can be approximated from $\Delta Yi$ and $\Delta Zi$ given by the equation (26) or the equation (27) as in equation (28):

$$\Delta Xi = \Delta YiR/\rho\cos\phi \qquad (28)$$
$$= \Delta ZiR/\rho\sin\phi$$

Accordingly, the increment in the longitudinal aberration of the spherical aberration as in equation (29) can be obtained for P=4 as:

$$\Delta Xi|_{p=4} = \frac{(N-N')}{N''}R^2b4k_1^4\rho^2 \qquad (29)$$

On the contrary, where P is greater than 2 and smaller than 4, the increment in the longitudinal aberration of the spherical aberration can be obtained as shown in equation (30)

$$\Delta Xi|_{2<p<4} = \frac{(N-N')}{N'} R^2 aP|k_1|^p \rho^{p-2} \quad (30)$$

Upon expressing the increment in the longitudinal aberration of the spherical aberration in a graph, if $\rho$ is taken on a vertical axis and the amount of the aberration is taken on the lateral axis as conventionally employed, the aberration curve contacts the vertical axis in the vicinity of $\rho=0$ in the same manner as in conventional aberration curve of optical system using quadratic surfaces or conventional aspherical surfaces if P is greater than 3 and smaller than 4. On the contrary, the aberration curve has a finite slope to both of the axes at $P=3$ and contacts the lateral axis where P is greater than 2 and smaller than 3. The above nature shows that the terms in the aspherical terms according to this invention where P is greater than 2 and smaller than 4 are very effective for the correction of the spherical aberration in the portion of smaller $\rho$.

Then, the increment in the third order distortion aberration can be obtained by setting $\rho=0$ in the equation (22) and the equation (23) as in equation (31):

$$\left. \begin{array}{l} \Delta Yi(\rho = 0)|_{p=4} = \frac{(N-N')}{N'} Rb4|k_1|k_2^3 \eta^3 \\ \Delta Zi(\rho = 0)|_{p=4} = 0 \end{array} \right\} \quad (31)$$

On the contrary, the increment in the position of the principal ray, that is, the increment in the distortion aberration can be obtained by setting $\rho$ to 0 in the equation (24) and the equation (25) as shown in equation (32):

$$\left. \begin{array}{l} \Delta Yi(\rho = 0)|_{2<p<4} = \frac{(N-N')}{N'} RaP|k_1||k_2|^{p-2}k_2|\eta|^{p-2}\eta \\ \Delta Zi(\rho = 0)|_{2<p<4} = 0 \end{array} \right\} \quad (32)$$

The increment in the ray aberration given by the equation (31) is in the same form as that obtained by substituting the term $(N''-N)b4|k_1|k_2^3\eta^3\rho\cos\phi$ in the equation (18) into the equation (20) or the equation (21) and it can be seen that the above term represents the increment in the third order distortion aberration.

Similarly, the increment in the ray aberration given by the equation (32) is in the same form as that obtained by substituting the term $(N''-N)aP|k_1|k_2|^{p-2}K_2|\eta-\rho|^{p-2}P\cos\phi$ in the equation (19) into the equation (20) or the equation (21) and it is shown that the above term or the term $(N''-N)aP|Ys|^{p-2}Ys\rho_o\cos\phi$ in the Table 1 means the increment in the distortion aberration. In addition, the term represented by the equation (32) represents the distortion aberration of $(P-1)$ order lower than the third order distortion aberration represented by the equation (31). As apparent from the comparison between the equation (31) and the equation (32), the equation (32) is in the same form as in the equation (31) when P approaches its extreme 4 showing that the distortion aberration of the $(P-1)$ order continuously transfers to the third order distortion aberration.

The shift of the tangential focus $\Delta T$ can be given from the increment $\Delta Yi$ of the ray aberration as in equation (33):

$$\Delta T = \lim_{\rho \to o} \left\{ \frac{R}{2\rho\cos\phi} [\Delta Yi(\phi = O) - \Delta Yi(\phi = x)] \right\} \quad (33)$$

The shift of the sagittal focus $\Delta S$ of the image surface position in the sagittal cross section can be represented from the increment $\Delta Zi$ of the ray aberration as in equation (34):

$$\Delta S = \lim_{\rho \to o} \left\{ \frac{R}{\rho\cos\phi} \Delta Zi(\phi = \pm \frac{x}{2}) \right\} \quad (34)$$

Accordingly, the shift of the tangential and the sagittal foli at $P=4$ can be represented as in equation (35) and equation (36):

$$\Delta T|_{p=4} = \frac{(N-N')}{N'} R^2 b|2k_1^2 k_2^2 \eta^2 \quad (35)$$

$$\Delta S|_{p=4} = \frac{(N-N')}{N'} R^2 b4 k_1^2 k_2^2 \eta^2 \quad (36)$$

Since the equation (35) is in the same form as in that obtained by substituting the equation (20) with the term $(N''-N)brk_1^2 k_2^2 \eta^2 \rho^2 \cos^2\phi$ in the equation (18) and further substituting the equation (33) with the above substituted result, and the equation (36) is in the same form as in that obtained by substituting the equation (21) with the term $(N''-N)b2k_1^2 k_2^2 \eta^2 \rho^2$ in the equation (18) and further substituting the equation (34) with the above substituted result, it can be seen that these terms correspond to the third order shift of the tangential and sagital foci.

The ratio between the amounts of shift of the foci in the tangential section and the sagittal section can be represented by taking the ratio between the equation (35) and the equation (36) as in equation (37):

$$\Delta T/\Delta B|_{p=4} = 3 \quad (37)$$

The relation represented by the equation (37) is well known in the correction for the third order astigmatism. On the contrary, the amount of the shift of the foci where P is greater than 2 and smaller than 4 can be given by substituting the equation (33) and the equation (34) by the equation (24) and the equation (25) as in equation (38) and equation (39):

$$\Delta T|_{2<p<4} = \frac{(N-N')}{N'} R^2 aP(p-1)k_1^2|k_2|^{p-2}|\eta|^{p-2} \quad (38)$$

$$\Delta S|_{2<p<4} = \frac{(N-N')}{N'} R^2 aPk_1^2|k_2|^{p-2}|\eta|^{p-2} \quad (39)$$

Since the equation (38) and the equation (39) are in the same forms as those obtained by substituting the equation (20) and the equation (21) with the term $$(N'-N)a \frac{P(p-2)}{2} K_1^2|K_2|^{p-2}\eta|^{p-2}\rho^2\cos^2\phi$$

and the term $$(N'-N)a \frac{P}{2} k_1^2|k_2|^{p-2}|\eta|^{p-2}\rho^2$$

in the equation (19) and further substituting the equation (33) or the equation (34) with the above substituted results respectively, it can be seen that these terms correspond to the amounts of the shift of the focus in the meridional section and the sagittal section.

By taking the ratio between the equation (38) and the equation (39), the relation of equation (40) being similar to the equation (37) can be obtained:

$$\Delta T/\Delta B|_{2<p<4}=P-1 \tag{40}$$

It can be seen, by comparing the equation (38), (39) and (40) with the equations (35), (36) and (37), that (P−1) order changes in the focus shift are resulted by the use of aspherical terms with P greater than 2 and smaller than 4 and the changes continuously transfer to the third order aberration where P approaches to its extreme 4. As apparent from the comparison between the equation (27) and the equation (40), the ratio of the amounts of the shift of the foci between the meridional section and sagittal section that has been considered fixed so far can be optionally varied to a value of (P−1) by using the aspherical terms with P greater than 2 and smaller than 4 according to this invention. This is one of the major advantages for correcting the astigmatism using the aspherical terms according to this invention.

Reference will now be made to the fact that the term
$$(N''-N)a\,P/2|K_1|^{P-2}K_2^2\eta^2\rho^{P-2}(1+(p-2)\cos^2\phi)$$
shown by the equation (19) represents the increment of the image field curvature near the optical axis.

It has already been described that the amounts of the shift of the foci in the meridional section and the sagittal section are given by the equation (33) and the equation (34), and also by the equation (38) and the equation (39) where $2<P<4$.

The term
$$(N'-N)a\frac{P(p-2)}{2}K_1{}^2|K_2|^{p-2}\eta|^{p-2}\rho^2\cos^2\phi$$
and the term
$$(N'-N)a\frac{P}{2}k_1{}^2|k_2|^{p-2}|\eta|^{p-2}\rho^2$$
in the equation (19) corresponding to the equation (38) and the equation (39) have, however, been determined under the conditions of $\rho_o<Y_s$ as shown in the equation (13).

If the amounts of the shift of the foci are calculated, as in conventional design, using a certain finite $\rho$, these terms can be applied no more when $\eta$ becomes so small as not to satisfy the condition $|k_1|\rho<|k_2\eta|$ in the vicinity of the optical axis. The amounts of shift $\Delta T'$ and $\Delta S'$ for the image field position under such conditions can be represented by setting $\rho$ used for the calculation of the variation as $\rho'$ as in equation (41) and equation (42).

$$\Delta T' = \frac{R}{2\rho'\cos\phi}[\Delta Y_i(\rho=\rho',\phi=O)-\Delta Y_i(\rho=\rho',\phi=x)] \tag{41}$$

$$\Delta S' = \frac{R}{\rho'\sin\phi}\Delta Z_i(\rho=\rho',\phi=\pm\frac{x}{2}) \tag{42}$$

$\Delta T'$ and $\Delta S'$ at P=4 can be given by substituting the equation (41) and the equation (42) with the equation (22) and the equation (23) as in equation (43) and equation (44):

$$\Delta T'|_{p=4}=\frac{(N'-N')}{N''}R^2b4k_1{}^2\rho'^2\cos^2\phi+3K_2{}^2\eta^2] \tag{43}$$

$$\Delta S'_{p=4}=\frac{(N'-N')}{N''}R^2b4k_1{}^2[K_1{}^2\eta'^2\cos^2\phi+K_2{}^2\rho^2] \tag{44}$$

While on the other hand, the following relation as given by equation (45) and equation (46) can be obtained on the assumption that $|k_1|\rho'>|k_2\eta|$ and by substituting the equation (41) and the equation (42) with the equation (24) and the equation (25):

$$\Delta T'|_{2=<p<4}=\frac{(N-N')}{N''}R^2aPK_1{}^2\{|K_1|^{p-2}\rho'^{p-2} \tag{45}$$
$$+\frac{(p-1)(p-2)}{2}|k_1|^{p-4}K_2{}^2\eta^2\rho'^{p-4}\}$$

$$\Delta S'|_{2<p<4}=\frac{(N-N')}{N''}R^2aPK_1{}^2\}|k_1|^{p-2}\rho'^{p-2} \tag{46}$$
$$+\frac{(p-1)}{2}|k_1|^{p-4}K_2{}^2\eta^2\rho'^{p-4}\}$$

The amount of variation in the radius of curvature on the image field near the optical axis due to the shift of the focus position for $|k_1|\rho>|k_2\eta|$ can be determined through second order differentiation of $\Delta T'$ and $\Delta S'$ with respect to $\eta$ as:

$$\frac{d^2}{d\eta^2}\Delta T'|_{p=4}=\frac{(N-N')}{N''}R^2b24k_1{}^2k_2{}^2 \tag{47}$$

$$\frac{d^2}{d\eta^2}\Delta S'|_{p=4}=\frac{(N-N')}{N''}R^2b8K_1{}^2K_2{}^2 \tag{48}$$

$$\frac{d^2}{d\eta^2}\Delta T'|_{2<p<4}=\frac{(N-N')}{N''}R^2aP(p-1)(p-2)K_1{}^2|K_1|^{p-4}\times K_2{}^2\rho'^{p-4} \tag{49}$$

$$\frac{d^2}{d\eta^2}\Delta S'|_{2<p<4}=\frac{(N-N')}{N''}R^2ap(p-2)K_1{}^2|k_1|^{p-4}\times K_2{}^2\rho'^{-4} \tag{50}$$

It can be seen, by comparing the equations (47) and (48) with the equations (49) and (50), that the amount of variation in the radius of curvature on the image field near the optical axis does not depend upon $\rho'$ at P=4 but it is in proportion to $\rho'$ raised with (P−4)th power at $2<P<4$. In the upper limit where P approaches to 4, the above variation in the radius of curvature is in the same form as that at P=4 and no more depends on $\rho'$. Where P approaches to its lower limit 2, the coefficient becomes 0 and the variation also becomes 0. The above nature shows that the image field curvature using the aspherical term at $2<P<4$ continuously connects the so-called Petyval curvature and the third order image field curvature. Since the term obtained by substituting the equation (20) and the equation (21) with the term $$(N'-N)a\frac{P}{2}|k_1|^{p-2}K_2^2\eta^2\rho^{p-2}(1+(p-2)\cos^2\phi)$$

in the equation (19), further substituting the equation (41) and the equation (42) with the above substitution results and performing second order differentiation for the final substitution result with respect to $\eta$ is in the same form as that of the equation (49) the equation (50) respectively, it is shown that the above term represents the variation in the image field curvature near the optical axis.

Finally reference is to be made that the term
$$(N'-N)aP|k_1|^{p-1}k_2\eta\rho^{p-1}\cos\phi$$
in the equation (19) represents the coma aberration of a lower order.

Since the term $(N'-N)b4k_1|^3k_2\eta\rho^3\cos\phi$ in the equation (18) is well known to represent the increment in the third order coma, the term is substituted into the equation (20) and the equation (21) and the results of the above substitution, $\Delta Yi'$ and $\Delta Zi'$, can be represented as shown in equation (51) and the equation (52) respectively:

$$\Delta Y_i' \, 5I_{p=4} = \frac{(N-N')}{N'} Rb4 \mid K_1 \mid ^3 K_2\eta \rho^2 (2 + \cos 2\phi) \quad (51)$$

$$\Delta Z_i' \, 5I_{p=4} = \frac{(N-N')}{N'} Rb4 \mid K_1 \mid ^3 K_2\eta \rho^2 \sin 2\phi \quad (52)$$

Modification of the above equations leads to the known relation with respect to the increment in the third order coma as shown in equation (53):

$$(\Delta Y_1' \mid _{p=4} D \mid _{p=4})^2 + (\Delta Z_i' \mid _{p=4})^2 = (\frac{D \mid _{p=4}}{2})^2 \quad (53)$$

where hu $D|p=4$ represents an amount given by the following equation (54):

$$D \mid _{p=4} = \frac{(N-N')}{N'} Rb8 \mid K_1 \mid ^3 K_2\eta \rho^2 \quad (54)$$

The increment in the third order coma varies within an area on the image field encompassed by a certain inclusion angle with the principal ray as the vertex and $\phi$ for the inclusion angle $2\phi$ can be represented as in equation (55):

$$\begin{aligned}\phi &= \sin^{-1}\{(D \mid _{p=4}/2)/(D \mid _{p=4})\mid \\ &= \sin^{-1}(\tfrac{1}{2}) \\ &= 30°\end{aligned} \quad (55)$$

Then, substitution of the equation (20) and the equation (21) with the term $(N'-N)aP|k_1|^{P-1}k_2\eta\rho^{P-1}\cos\phi$ in the equation (19) gives the following relation shown by equations (56) and (57):

$$\Delta Y_i' \mid _{2<p<4} = \frac{(N-N')}{N'} RaP \mid K_1 \mid ^{P-1} K_2\eta\rho^{P-2}(\frac{P}{2} + \frac{P-2}{2}\cos 2\phi) \quad (56)$$

$$\Delta Z_1 \mid _{2<p<4} = \frac{(N-N')}{N'} RaP(\frac{P-2}{2}) \mid K_1 \mid ^{P-1} K_2\eta\rho^{P-2} \sin 2\phi \quad (57)$$

Modification of the above equations (56) and (57) provides the relation as in equation (58) corresponding to the equation (53):

$$(\Delta Y_i' \mid _{2<p<4} - D \mid _{2<p<4})^2 + (\Delta Z_i' \mid _{2<p<4})^2 = (D \mid _{2<p<4} \cdot \frac{P-2}{P})^2 \quad (58)$$

where hu $D|2<P<4$ represents an amount as shown in equation (59):

$$D \mid _{2<p<4} = \frac{(N-N')}{N'} Ra \frac{P^2}{2} \mid k_1 \mid ^{P-1} K_\eta\rho^{P-2} \quad (59)$$

The inclusion angle $\phi$ is given as in equation (60):

$$\begin{aligned}\phi &= \sin^{-1}\mid(D \mid _{2<p<4} \frac{P-2}{P})/(D \mid _{2<p<4})\mid \\ &= \sin^{-1}(\frac{P-2}{P})\end{aligned} \quad (60)$$

It can thus be seen, by comparing the equations (56) through (60) with each of their corresponding equations (51) through (55), that $(N'-N)aP|k_1|^{P-1}k_2\eta\rho^{P-1}\cos\phi$ shows the increment in the coma of an order lower than that of the third order coma.

It will be apparent that the coma also changes its nature continuously depending on the value of P as in other types of aberrations and takes a same type as in the increment of the third order coma where P approaches its upper limit 4.

The meanings for each of the terms shown in Table 1 can now be clarified from the considerations detailed above.

As aforesaid, aberration of orders lower than those of the third order aberration known so far can be accomplished by using the aspherical terms in which the power number P is greater than 2 and smaller than 4. And, since the nature of such lower order aberration is apparent, the concept for the correction of the aberration that has not yet been known so far can be utilized by using these aspherical terms.

The characteristic features of this invention for the correction of the aberration by the aspherical terms may be extended to further specific cases, in the same manner as in the case where P is greater than 2 and smaller than 4, such as by relating the case at $4<P<6$ to conventional the third and the fifth order aberrations and the case at $6<P<8$ with the conventional the fifth and the seventh order aberrations. The advantages of using aspherical terms with real number power greater than 2 will be described qualitatively hereinafter. In general, the purpose of rendering the optical surface aspherical is to set the amount of deformation $\Delta X$ of the optical surface and the increment in the inclination $\Delta \theta$ of the tangential plane of the optical surface to desired values by its aspherical terms.

Where conventional aspherical terms are employed, however, since their number powers are restricted only to even numbers, the relations between $\Delta X$ and $\Delta \theta$ in an arbitrary point on the optical surface are given as follows:

$$\Delta X \mid _{p=2n} = na^{2n} \quad (61)$$
$$\Delta \theta \mid _{p=2n} = 2nah^{2n-1} \quad (62)$$
$$\Delta \theta / \Delta X \oplus _{p=2n} = 2n/h \quad (63)$$

Since the ratio between $\Delta \theta$ and $\Delta X$ is dispersive, a plurality of aspherical terms have to be used in order to set the ratio to a desired value.

With the use of the aspherical terms according to this invention, however, $\Delta X$ and $\Delta \theta$ can be related to each other as follows:

$$\Delta X = ah^P \quad (64)$$

$$\Delta \theta = Pah^{P-1} \quad (65)$$

$$\Delta \theta / \Delta X = P/h \quad (66)$$

That is, the ratio between $\Delta \theta$ and $\Delta X$ can optionally be set by selecting the value for P so as to satisfy the equation (66).

Even in the case where only $\Delta \theta$ is to be set to a desired value at several points on the optical surface, the number power of the highest order for the aspherical term has to be increased in accordance with the increase in the points to be set with the conventional aspherical terms where only the even number powers are used, since the number power is dispersive. Since aspherical terms are required, for example, in the number of N in order to optionally set the value for $\Delta \theta$ at N points, the value for the number power of the highest order in the conventional aspherical term increases above 2N. But the increase in the number power results in significant changes in $\Delta X$ and $\Delta\theta$ in the portion on the optical surface where h is great thereby requiring aspherical terms of higher order in order to suppress such changes, thereby leading to undesired circle. On the contrary, since the number power of the highest order can optionally be set according to this invention, the above undesired circle encountered so far in the use of the conventional aspherical terms can be avoided and the correction for the aberration can be performed efficiently.

As foregoing, according to this invention, a new and effective concept for the correction of the aberration can be utilized by the use of real number power greater than 2 for the aspherical terms as compared with those conventional cases restricting the power number only to even numbers, as well as the degree of freedom in the design can significantly be improved since the value for the number power is continuous.

The excellent effect of the aspherical surfaces according to this invention over conventional aspherical surfaces is to be shown by the application of this invention to a simple lens system. An aspherical surface single meniscus lens as disclosed in U.S. Pat. No. 3,903,792 is to be improved utilizing the concept of this invention.

Figure 5:
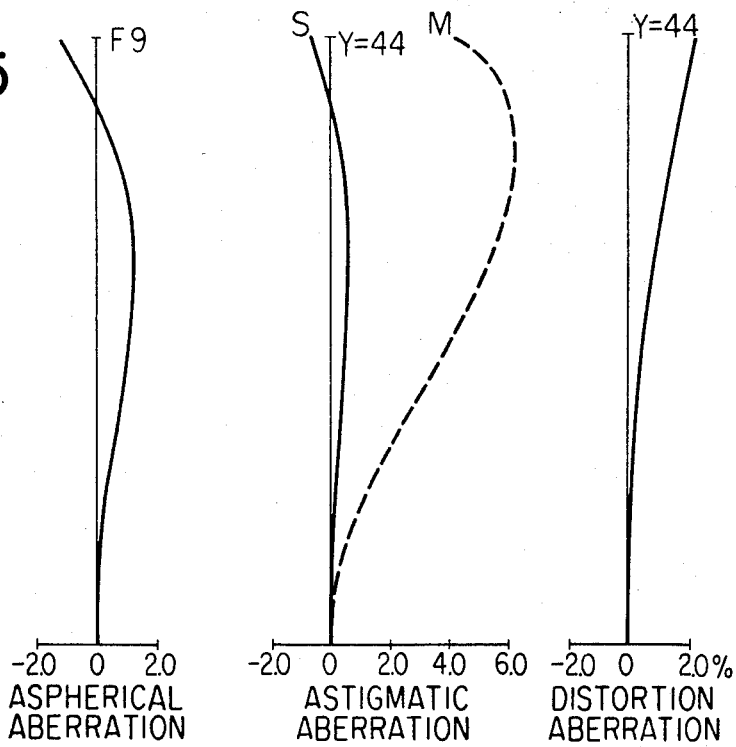
FIG. 5 is a diagram illustrating the state of aberration correction in known aspherical surfaces.

The example disclosed in the above U.S. Patent has the following specification, for the focal length of 100:

| | | |
|---|---|---|
| $r_1 = 18.4$ | $d_1 = 2.8$ | $n_1 = 1.49$ |
| $r_2 = $ aspherical | $d_2 = 5.6$ | |
| $r_3 = \infty$ | $d_3 = 6.8$ | |
| $r_4 = \infty$ | | | where $r_1$ is the radius of curvature for the spherical surface, $d_1$ is the thickness of glass material, $n_1$ is the refractive index of the glass material, $d_2$ is the distance between the aspherical surface lens and the diaphragm $r_3$ defining the F value, $d_3$ is the distance between the $r_3$ and the field diaphragm $r_4$, and the form of the aspherical surface $r_2$ is represented as $X = 0.17985612 \times 10^{-1} \times h^2 + 0.29083 \times 10^{-4} \times h^4 - 0.44969 \times 10^{-6} \times h^6 + 0.3808 \times 10^{-8} \times h^8 - 0.10991 \times 10^{-10} \times h^{10}$. As apparent here, the above lens uses, as its aspherical term, only those terms with power number h of even number as conventionally employed so far and the diagram for the aberration where F value is f/9 is as shown in FIG. 5.

Figure 6:
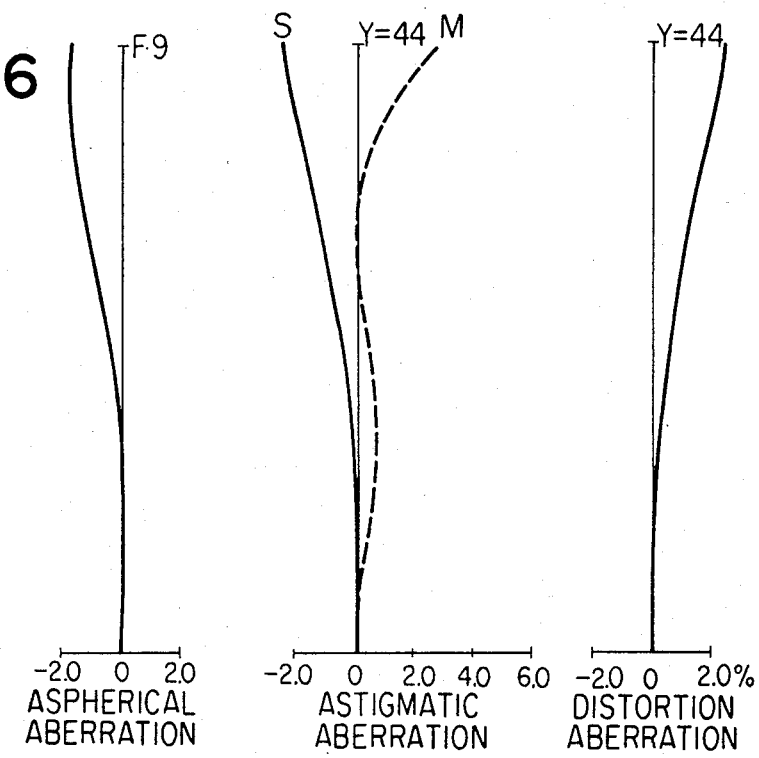
FIG. 6 is a diagram showing the state of aberration correction where the aspherical surface is improved according to the present invention.

On the contrary, the aspherical surface, for example, the second surface can be chosen as $X = 0.17985612 \times 10^{-2} \times h^2 + 0.284 \times 10^{-4} \times h^{3.7} - 0.165 \times 10^{-5} \times h^{5.4} + 0.875 \times 10^{-7} \times h^{7.1} - 0.176 \times 10^{-8} \times h^{8.5}$ by correcting the aberration based on the concept of this invention, whereby the aberration is as shown in FIG. 6 and the correction for the aberration can remarkably be improved.

What we claim is:

1. An optical system having an optical surface containing aspherical terms with real number powers characterized in that the configuration of an optical surface having a symmetry of revolution with respect to its optical axis is defined by the length of a horizontal perpendicular from an arbitrary point on said optical surface to a plane tangent to the vertex of said optical surface, which is represented as a function of an absolute value for the height of said arbitrary point from said optical axis, and the function contains aspherical terms with real number powers which are greater than 2 for said absolute value but not an integer.

* * * * *